(12) United States Patent
Nagasaka (10) Patent No.: US 7,419,312 B2
(45) Date of Patent: Sep. 2, 2008

(54) OPTICAL MODULE

(75) Inventor: Kimio Nagasaka, Hokuto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/626,421

(22) Filed: Jan. 24, 2007

(65) Prior Publication Data

US 2007/0183725 A1 Aug. 9, 2007

(51) Int. Cl.
*G02B 6/36* (2006.01)

(52) U.S. Cl. .................................. 385/92; 385/88

(58) Field of Classification Search .............. 385/92
See application file for complete search history.

(56) References Cited

U.S. PATENT DOCUMENTS

2004/0202477 A1* 10/2004 Nagasaka et al. ........... 398/138
2006/0210225 A1 9/2006 Fujiwara et al.

FOREIGN PATENT DOCUMENTS

JP 2002-365491 12/2002
JP 2004-333590 11/2004

* cited by examiner

*Primary Examiner*—Hemang Sanghavi
*Assistant Examiner*—Kajli Prince
(74) *Attorney, Agent, or Firm*—Harness, Dickey & Pierce, P.L.C.

(57) ABSTRACT

An optical module: an optical plug that supports one end of an optical fiber and has a first surface that is generally in parallel with an extension direction of the optical fiber at one end side thereof and two second surfaces traversing the first surface; an optical element container that has an optical element and a transparent surface traversing an optical axis of the optical element, and is disposed such that the optical axis of the optical element and an optical axis of the optical fiber cross one another; an optical block having an optical reflection surface disposed at an intersection of the optical axis of the optical element and the optical axis of the optical fiber; and a resin member that includes a first guide surface in contact with one of the two second surfaces of the optical plug and a second guide surface in contact with the transparent surface of the optical container on which the optical plug is mounted.

8 Claims, 11 Drawing Sheets

OPTICAL MODULE

The entire disclosure of Japanese Patent Application No. 2006-030598, filed Feb. 8, 2006 is expressly incorporated by reference herein.

BACKGROUND

1. Technical Field

The present invention relates to optical modules that are used for optical communications.

2. Related Art

As a typical example of an optical module that is used for optical communications optical module, an optical module described in Japanese laid-open patent application JP-A-2002-365491 (patent document 1) is known. The optical module described in the above document is not necessarily suitable when easiness in assembly is a considering factor, and requires further improvement. This inconvenience would likely become more noticeable when further miniaturization of optical modules is pursued.

SUMMARY

In accordance with an advantage of some aspects of the present invention, it is possible to provide an optical module that can be readily assembled.

An optical module in accordance with an embodiment of the invention includes: an optical plug that supports one end of an optical fiber and has a first surface that is generally in parallel with an extension direction of the optical fiber at one end side thereof and two second surfaces traversing the first surface; an optical element container that has an optical element and a transparent surface traversing an optical axis of the optical element, and is disposed such that the optical axis of the optical element and an optical axis of the optical fiber cross one another; an optical block having an optical reflection surface disposed at an intersection of the optical axis of the optical element and the optical axis of the optical fiber; and a resin member that includes a first guide surface in contact with one of the two second surfaces of the optical plug and a second guide surface in contact with the transparent surface of the optical container on which the optical plug is mounted. It is noted that the "transparent surface" is a surface on the outside of the optical element container, transparent (having a high transmittivity) to wavelengths of light emitted from or received by the optical element at least neighborhood of the optical axis of the optical element, and capable of inputting and outputting of optical signals.

According to the structure described above, the optical plug and the optical element container can be combined by using the resin member. Accordingly, an optical module that is readily assembled can be obtained.

Preferably, the optical plug may be disposed in contact with the optical block.

By this, the optical plug can be positioned by using the optical block, which makes assembly of the optical module much easier.

Preferably, the resin member may have a groove section along an extension direction of the optical fiber, wherein an inner wall surface of the groove section is used as the first guide surface.

By this, a grooved section that is relatively easy to form can be used as the first guide surface.

Preferably, the resin member may include a thin portion having a first thickness relatively small in a first direction orthogonal to the optical axis of the optical fiber and a thick portion having a second thickness greater than the first thickness of the thin portion, wherein the second guide surface is formed as a surface of the thin portion.

By this, the optical element container can be disposed closer to the thin portion, such that the thickness of the optical module as a whole can be reduced.

Preferably, the resin member may further include a third guide surface in contact with the first surface of the optical plug, wherein the third guide surface is formed over the thin portion and the thick portion, wherein the optical block is disposed on the third guide surface.

By this, the optical block can be positioned by using the third guide surface, such that assembly of the optical module becomes much easier. Also, the structure of the optical module can be simplified.

Preferably, the thin portion may include two arm sections protruding from one end of the thick portion and disposed interposing the optical block, and the second guide surface may be formed as a surface of each of the arm sections.

By this, the optical block can be disposed between the arm sections, such that the thickness of the optical module as a whole can be further reduced.

When the thin portion includes two arm sections, as described above, the optical block may preferably be disposed on the transparent surface of the optical element container.

By this, the optical block can be positioned by using the transparent surface of the optical element container, such that assembly of the optical module becomes much easier. Also, the structure of an optical module can be simplified.

Preferably, the sum of the thickness of the thin portion and the thickness of the optical element container in the first direction may be generally equal to the thickness of the thick portion in the first direction.

By this, the thickness of the optical module as a whole extending from the thick portion to the thin portion can be made generally constant. For example, the lower side of the optical module can be made generally flat, which is convenient when the optical module is disposed on a circuit substrate or the like.

Preferably, the resin member may further include a third guide surface in contact with the first surface of the optical plug, and the optical module may further include a holder having a leaf spring section that is in contact with the optical plug and forces the optical plug to the third guide surface and a hook that engages with the thin portion of the resin member, wherein the holder covers the resin member and the optical plug.

By this, the resin member and the optical plug can be retained in one piece by using the holder, such that assembly of the optical module can be made much easier.

Preferably, the resin member may further include protruded sections protruding from one end of at least one of the thin portion and the thick portion along an optical axis direction of the optical fiber, and the holder may further include opening sections that mate with the protruded sections of the resin member.

By this, integrity of the optical plug and the resin member can be more securely retained by using the protruded sections and the opening sections.

DESCRIPTION OF EXEMPLARY EMBODIMENTS

Preferred embodiments of the invention are described below with reference to the accompanying drawings.

Figure 1:
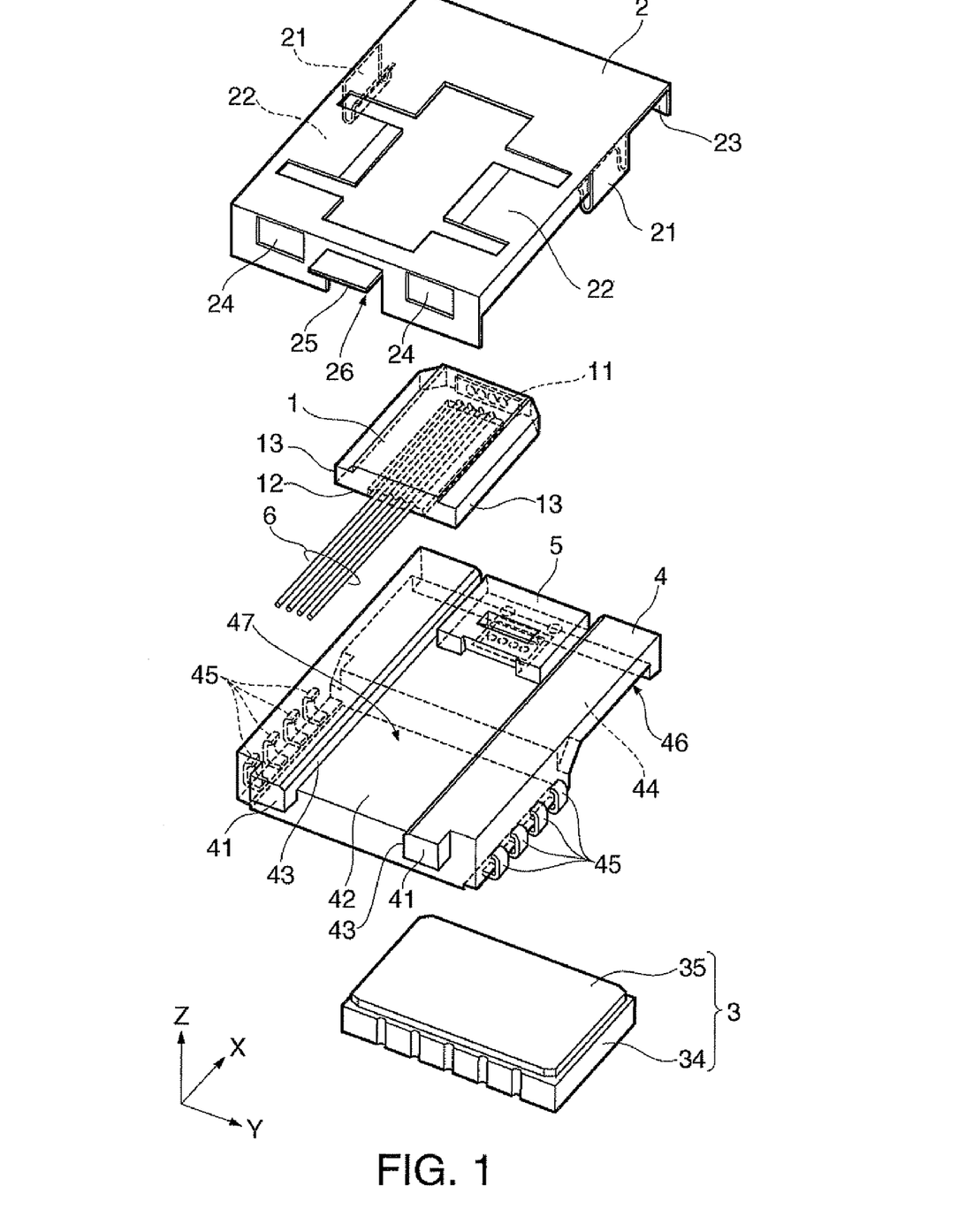
FIG. 1 is an exploded perspective view of the overall structure of an optical module in accordance with a first embodiment of the invention.
Figure 2:
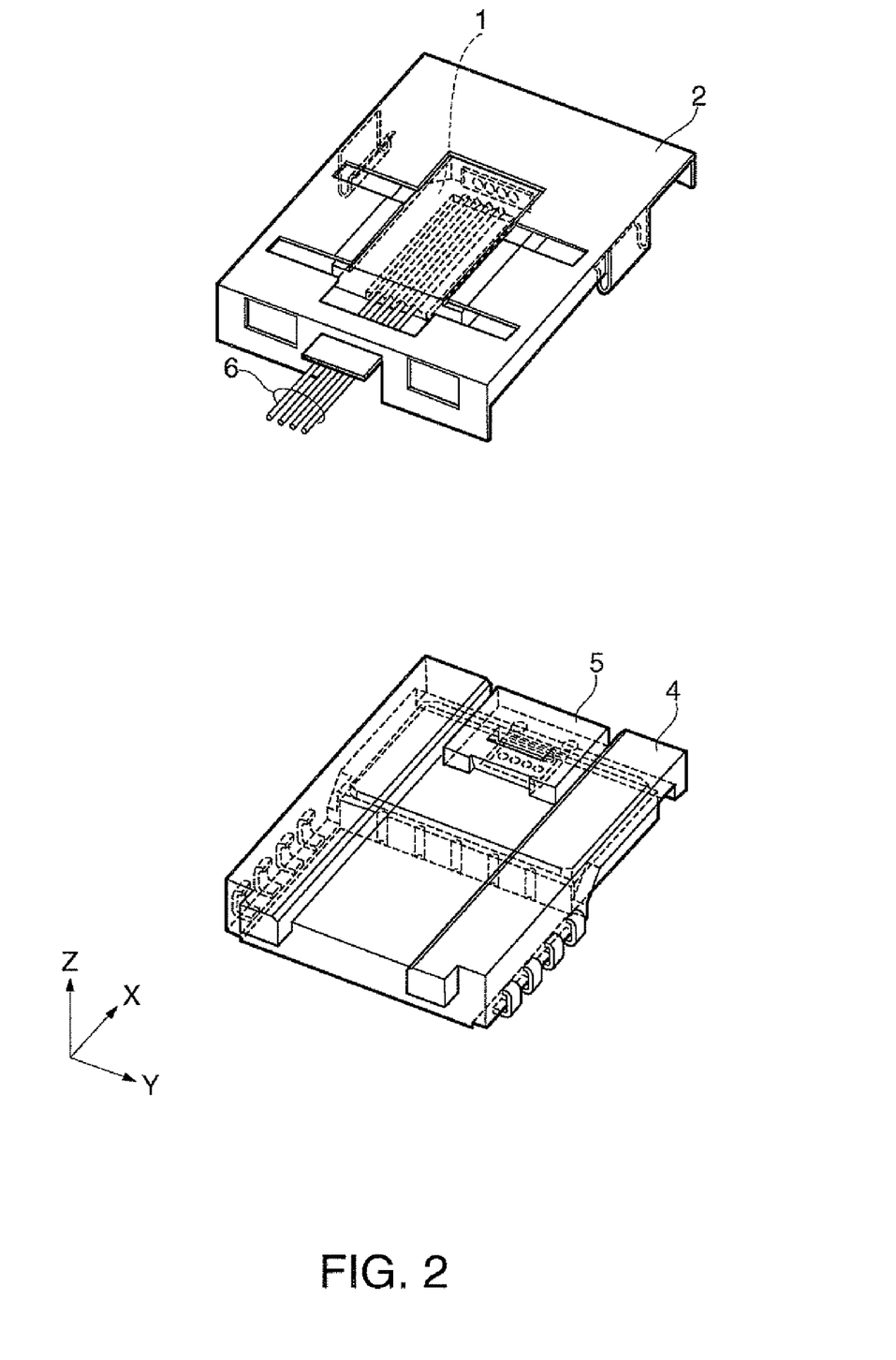
FIG. 2 is an exploded perspective view of the structure of the optical module showing a plug unit and a receptacle unit separated from each other.
Figure 3:
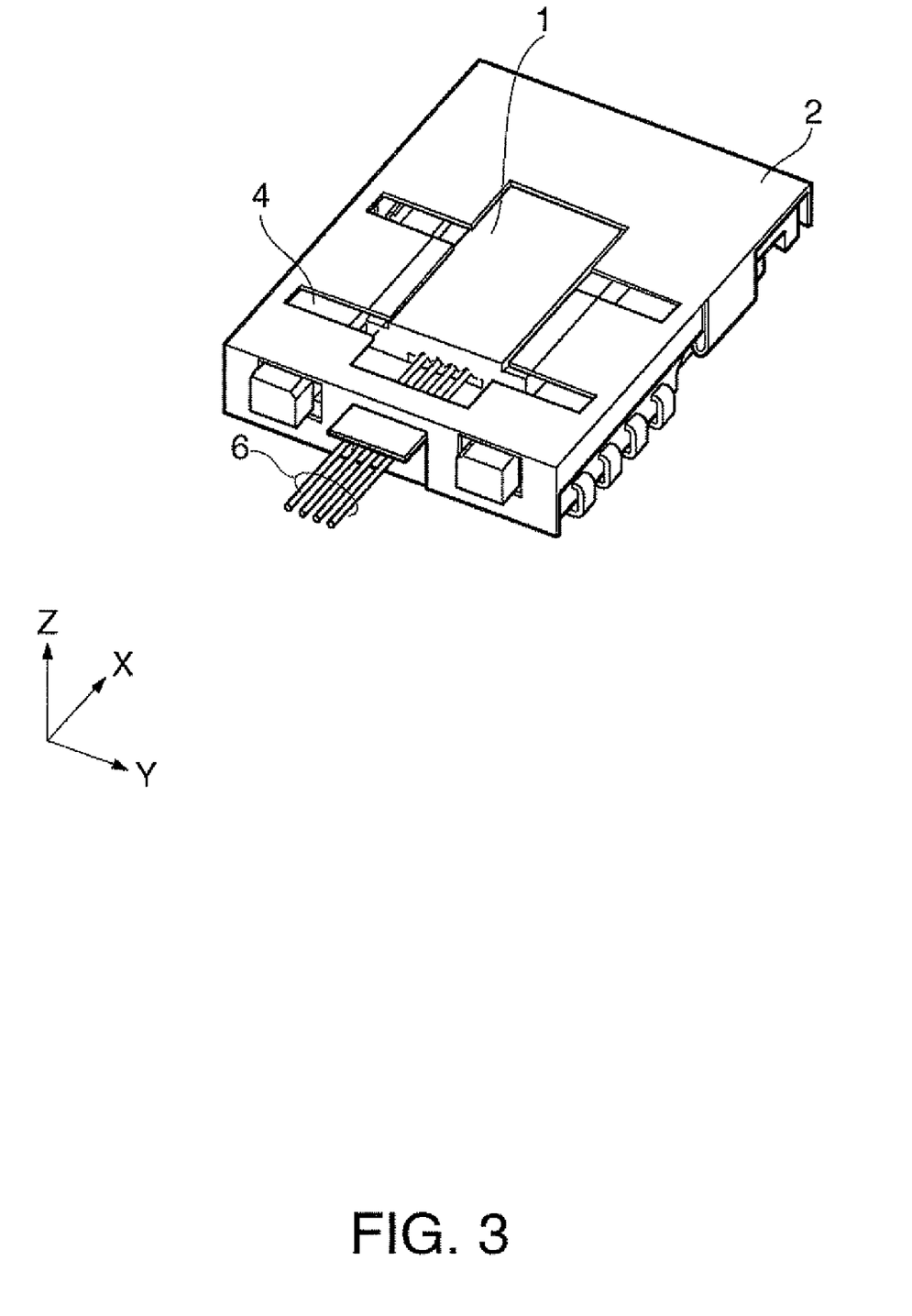
FIG. 3 is a perspective view of the optical module in an assembled state.
Figure 4:
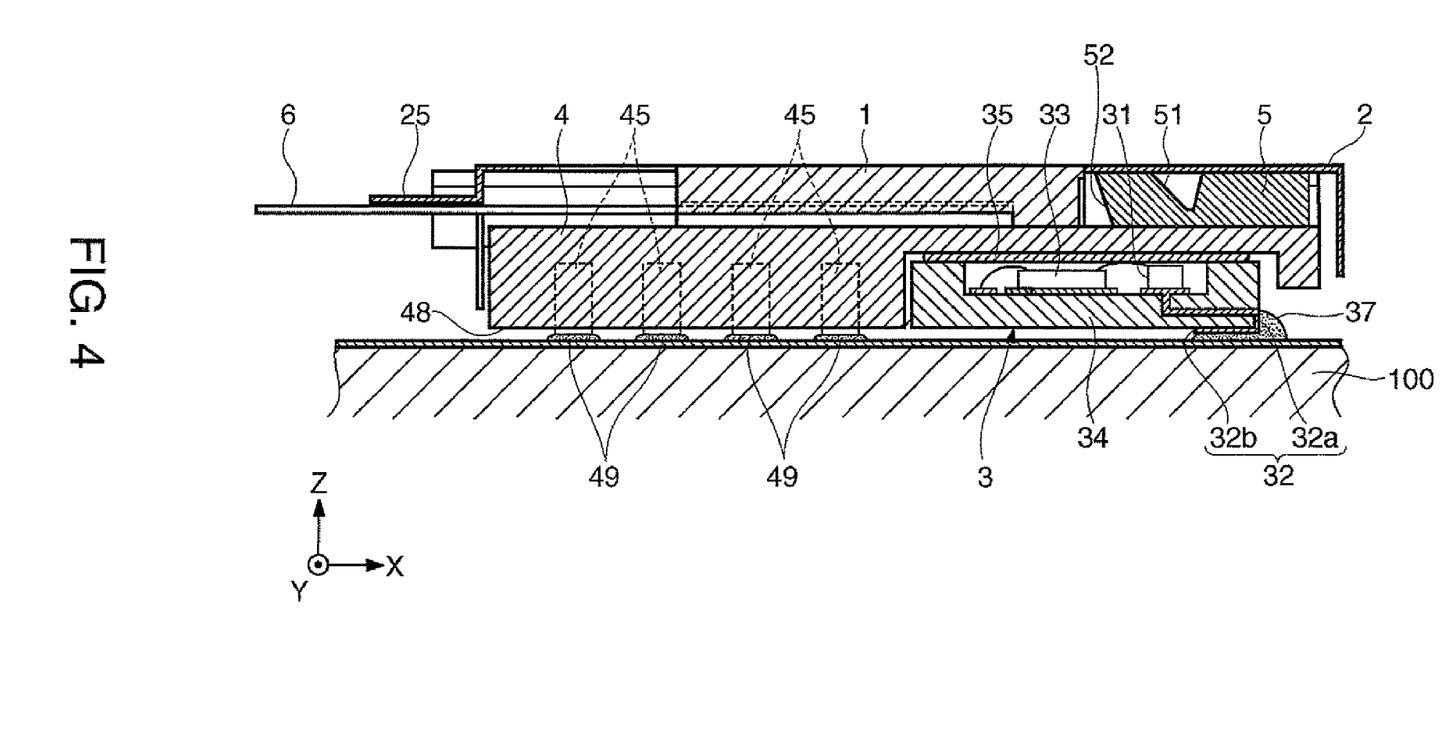
FIG. 4 is a cross-sectional view of the optical module taken along a direction in which the optical fiber extends.
Figure 5:
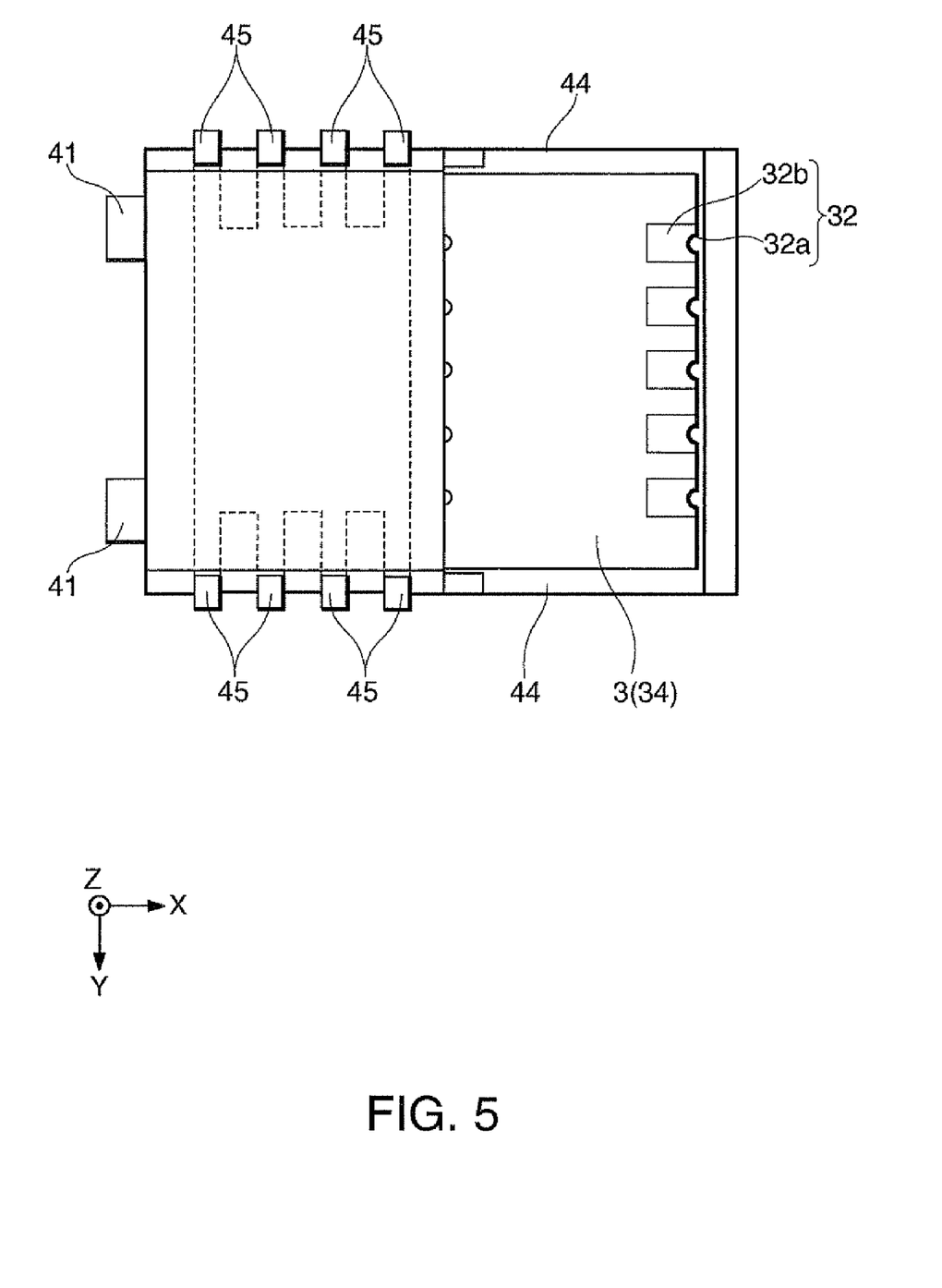
FIG. 5 is a bottom plan view of the optical module.

FIG. 1 is an exploded perspective view of the overall structure of an optical module in accordance with a first embodiment of the invention. FIG. 2 is an exploded perspective view of the structure of the optical module showing a plug unit and a receptacle unit separated from each other. FIG. 3 is a perspective view of the optical module in an assembled state. FIG. 4 is a cross-sectional view of the optical module taken along a direction in which the optical fiber extends. FIG. 5 is a bottom plan view of the optical module. The optical module in accordance with the first embodiment shown in FIGS. 1-5 may be an optical module disposed on, for example, a substrate equipped with an electric circuit (a circuit substrate), and includes an optical plug 1, a clamp (holder) 2, a ceramic package (optical element container) 3, a resin package (resin member) 4, and an optical block 5. The optical plug 1 and the clamp 2 jointly form a plug unit, and the ceramic package 3, the resin package 4 and the optical block 5 jointly form a receptacle unit.

The optical plug 1 supports one end of an optical fiber 6. The optical plug 1 may be formed by, for example, resin injection molding. The optical plug 1 has V-letter shaped grooves and a plate member that covers the grooves. One ends of the optical fibers 6 are disposed in the V-letter shaped grooves, and the ends of the optical fibers are pressed by the plate member, thereby supporting the optical fibers 6. Also, to smooth out an operation to fit the optical plug 1, sloped surfaces are provided on both sides of the optical plug 1 at a tip portion thereof. It is noted that sloped surfaces may be similarly provided on both sides of the optical plug 1 at a rear end thereof.

Also, the optical plug 1 has a focusing lens 11 disposed on an optical axis of the optical fiber 6. In the example shown in the figure, a plurality of focusing lenses 11 are provided at one end side of the optical plug 1 in its longitudinal direction. One end of the optical plug 1 on the side where the focusing lenses 11 are formed abuts against the optical block 5, whereby the optical plug 1 is positioned in an X-axis direction.

Furthermore, the optical plug 1 is equipped with a first surface (bottom surface) 12 that extends generally in parallel with an extension direction (X-direction indicated in the figure in the present example) of the optical fiber 6 on its one end side (a portion that is held by the optical plug in the present embodiment), and two second surfaces (side surfaces) 13 that are disposed interposing one end side of the optical fiber 6 and generally orthogonal to the first surface 12. As illustrated in the present example, the first face 12 extends in parallel with an XY plane, and the second faces 13 extend in parallel with an XZ plane. It is noted that the first surface 12 and the second surfaces 13 need only to intersect each other, and may not necessarily be generally orthogonal to each other.

The clamp (holder) 2 is disposed in a manner to surround the entire body of the receptacle unit, thereby joining the optical plug 1 and the receptacle unit in one piece. The clamp 2 may be formed, for example, from a metal plate that is punched out and bent by a press machine. The clamp 2 is equipped with generally J-letter shaped hooks 21 on its side surfaces, leaf springs 22, a light shield section 23, engagement holes (opening sections) 24, a fiber support member 25 and a window section 26. The clamp 2 mates with the receptacle unit, thereby joining the receptacle unit and the optical plug 1 together in one piece.

The hooks 21 engage with latch sections 44 of the resin package 4. By this, the receptacle unit and the plug unit are joined together in one piece.

The leaf spring 22 may be formed through cutting an upper portion of the clamp 2 in a generally H-letter shape. The leaf springs 22 are in contact with end sections of the optical plug 1 in its longitudinal direction and force the optical plug 1 toward a guide surface (mounting surface) 42 of the resin package 4. By this, the optical plug 1 is brought in tight contact with the resin package 4.

The light shield section 23 is disposed at a tip end side of the clamp 2, in a manner to intersect the optical axis of the optical fiber 6. The light shield section 23 is a plate portion formed by bending a portion of the clamp 2 as illustrated. The light shield section 23 prevents laser light emitted from the optical plug 1 from leaking outside when the plug unit is not coupled with the receptacle unit.

The engagement holes (opening sections) 24 are provided in a plate portion that is formed by bending a portion of the clamp 2 at its rear end side. Two engagement holes 24 are provided in the present example. The engagement holes 24 function to retain the receptacle unit and the plug unit in one piece by engaging with engaging pins (protruded sections) 41 provided on the resin package 4, respectively.

The fiber support section 25 is formed by bending a portion of the plate portion of the clamp 2 at its rear end side. The fiber support section 25 in the present example is interposed between the two engagement holes 24 generally at the center of the read end side of the clamp 2. When the optical plug 1 is covered by the clamp 2, the optical fiber 6 is disposed at the fiber support section 25. The fiber support section 25 in accordance with the present embodiment includes a plate section 25a disposed in contact with one side of the window section 26, as shown in the figure.

The window section 26 is formed by cutting a portion of a plate section that is formed by bending a portion of the clamp 2 on its end side. The window section 26 of the present example is interposed between the two engagement holes 24. It is noted that the window section 26 of the present example has one side (at a lower end side) that is open, but this side may be closed. When one side of the window is open, the optical fiber 6 can be more readily disposed in the fiber support section 25, when the optical plug 1 and the clamp 2 are coupled together.

The ceramic package (optical element container) 3 stores the optical element 31 (see FIG. 4), and has electrodes 32 that are electrically connected to the optical element 31. More specifically, the ceramic package 3 in accordance with the present embodiment is formed with ceramics material, and is equipped with a box shaped member 34 having a recessed section for disposing the optical element 31, the circuit chip 33 and the like, and a transparent plate (a glass plate in the present example) 35 disposed on the upper side of the box shaped member 34 in a manner to cover the aforementioned recessed section. The box shaped member 34 and the transparent plate 35 seal up the optical element 31 and the circuit chip 33. The ceramic package 3 is disposed in a manner that the optical axis of the optical element 31 contained therein intersects the optical axis of the optical fiber 6.

The optical element 31 may be a light emission element (for example, a VCSEL) that outputs optical signals, or a photodetecting element that receives optical signals. The optical element 31 is disposed with its optical axis being generally perpendicular to the transparent plate 35, and outputs optical signals through the transparent plate 35 or receives optical signals.

The circuit chip 33 may be a driver that drives the optical element 31, when the optical element 31 is a light emission element; and may be an amplifier that amplifies electrical signals outputted from the optical element 31, when the optical element 31 is a photodetecting element. In the present example as shown in the figure, the optical element 31 and the circuit chip 33 are connected by wire bonding.

The electrodes 32 are formed in a manner that part thereof is exposed outside, and are connected to the optical element 31 and the circuit chip 33 through wirings that pass through the box shaped member 34. The electrodes 32 shall be described in greater detail below.

The transparent plate 35 is disposed with its surface (transparent surface) being generally orthogonal to the optical axis of the optical element 31. In the present example, the optical axis of the optical element 31 is in parallel with a Z-axis as shown in the figure, such that the transparent surface is disposed generally orthogonal to the Z-axis. In other words, the transparent plate 35 is disposed with its transparent surface being generally in parallel with the XY plane.

The resin package (resin member) 4 functions to support and position the optical plug 1, and is disposed along the optical axis direction of the optical fiber 6, juxtaposed with the ceramic package 3. The resin package 4 is equipped with the engaging pins 41 described above, guide surfaces 42, 43, and 44, and a plurality of lead electrodes 45. The resin package 4 can be fabricated by, for example, transfer molding with thermosetting type resin such as epoxy resin. When an epoxy resin material mixed with glass fine particles or fibers is used, the dimensional accuracy can be increased, and precise guide surfaces can be formed.

The guide surface (third guide surface) 42 is brought in contact with the first surface 12 of the optical plug 1, when the optical plug 1 is mounted on the resin package 4. In the present embodiment, the guide surface 42 is formed to be a plane surface that is generally in parallel with the first surface 12 of the optical plug 1. By disposing the plug 1 in contact with the guide surface 42, the plug 1 is positioned in the Z-axis direction.

The guide surfaces (first guide surfaces) 43 are formed to be disposed generally orthogonal to the guide surface 42. The guide surfaces 43 are in contact with either of the two second surfaces 13 of the optical plug 1. In the present embodiment, the guide surfaces 43 are formed to be surfaces generally in parallel with the second surfaces 13 of the optical plug 1. By disposing the optical plug 1 to be interposed between the guide surfaces 43, the optical plug 1 can be positioned in the Y-axis direction. It is noted that the guide surfaces 42 and the guide surfaces 43 need only to intersect each other, and may not necessarily be generally orthogonal to each other.

The guide surface (second guide surface) 44 is in contact with the surface (transparent surface) of the transparent plate 35 of the ceramic package 3. In the present embodiment, the guide surface 44 is formed to be in parallel with the XY plane. By disposing the ceramic package 3 in contact with the guide surface 44, the ceramic package 3 is positioned in the Z-axis direction.

The plural lead electrodes 45 are provided with a part thereof enclosed by the resin package, and in a manner to protrude toward the lower surface that is to be opposed to the circuit substrate 100 of the resin package 4. In the present embodiment, four lead electrodes 45 are provided on each of the sides of the resin package 4 along its longitudinal direction. Also, in accordance with the present embodiment, the lead electrodes 45 are not used for securing electrical connection, but instead used for joining and affixing the resin package 4 onto the circuit substrate 100. It is noted however that the lead electrodes 45 may also be used to secure electrical connection.

Next, the structure of the resin package 4 in accordance with the present embodiment is further described in greater detail. The resin package 4 includes a thin portion having a thickness relatively small in a first direction (Z-axis direction in the figure) orthogonal to the optical axis of the optical fiber 6, and a thick portion having a relatively greater thickness than the thin portion. Concretely, in the resin package 4 as illustrated in the figure, a front portion thereof where the optical plug 1 is mounted corresponds to the "thick portion," and a rear portion thereof where the optical block 5 is disposed on the upper side and the ceramic package 3 is disposed on the lower side corresponds to the "thin portion." Further, the second guide surface 44 is formed as one surface of the thin portion. The hooks 21 engage with portions of the thin portion corresponding to the end portions of the second guide surface 44. Also, the third guide surface 42 is formed as a continuous plane surface extending over the thin portion and the thick portion. Also, as shown in the cross-sectional view of FIG. 4, the resin package 4 is formed such that the sum of the thickness of the thin portion (in the Z-axis direction) and the thickness of the ceramic package 3 (in the Z-axis direction) is generally equal to the thickness of the thick portion (in the Z-axis direction).

Also, the resin package 4 has a groove section 47 formed along the extension direction of the optical fiber 6 (in the X-axis direction in the figure) extending over the thin portion and the thick portion described above. Among inner wall surfaces of the groove section 47, the bottom surface is used as the third guide surface 42 described above, and the side surfaces are used as the first guide surfaces 43 described above. The width of the groove section 47 (i.e., the distance between the two first guide surfaces 43) is generally equal to the width of the optical plug 1 (i.e., the distance between the two second surfaces 13). Also, in order to smooth out an operation to fit the optical plug 1 in the groove section 47, sloped surfaces are provided on the side walls of the groove section 47 at its upper side.

The optical block 5 has a light reflection surface 51 that is disposed at an intersection between the optical axis of the optical element 31 and the optical axis of the optical fiber 6

(see FIG. 4). The optical block 5 is disposed on the guide surface 42 of the resin package 4.

The optical block 5 is composed of light transmissive resin, and has a sloped surface by cutting a portion of the resin, wherein the sloped surface functions as a light reflection surface 5. More concretely, optical signals outputted from the optical element 31 are focused by the focusing lens formed at the lower surface of the optical block 5, reflected by the light reflection surface 51, and enter one end of the optical fiber 6 through a refraction surface 52. Also, optical signals outputted from the optical fiber 6 are incident upon the light reflection surface 51 through the refraction surface 52, reflected by the light reflection surface 51 and focused by the focusing lens described above, and reach the optical element 31.

It is noted that the refraction surface 52 is a surface that does not intersect orthogonally to the optical axis of the optical fiber 6 but is disposed to intersect the optical axis of the optical fiber 6 at an angle. The refraction surface 52 functions to prevent a component of an optical signal emitted from the optical fiber 6 from returning to the optical fiber 6 as reflection light, or to prevent a component of an optical signal emitted from the optical element 31 and reflected by the light reflection surface 51 and reaching the refractive surface 52 from returning to the optical element 31 as reflection light (a returning light prevention function).

Next, a state in which the optical module is mounted on the circuit substrate 100 is described in detail.

The electrodes 32 provided at the ceramic package 3 have, as shown in FIG. 4 and FIG. 5, exposed portions 32a provided on the side surface of the ceramic package 3, and pad sections 32b provided on the lower surface of the ceramic package 3. In the present embodiment, each of the electrodes 32 is provided in a plane orthogonal to an extending direction of the optical fiber 6 to be mounted on the optical module of the ceramic package 3 (i.e., in a plane parallel with the YZ plane). Also, the electrodes 32 are electrically connected and mechanically affixed to connection pads or the like on the circuit substrate 100 through solder 37. More specifically, as shown in FIG. 4, each of the electrodes 32 is bonded to the circuit substrate 100 in a manner that both of the exposed portion 32a and the pad section 32b are in contact with the solder 37. It is noted that either the exposed portion 32a or the pad section 32b alone may be in contact with the solder.

Each of the lead electrodes 45 on the resin package 4 is formed in a generally L-letter shape as shown in FIG. 1, and provided along the side surface and the lower surface of the resin package 4. Also, as shown in FIG. 5 in broken lines, a portion of the lead electrode 45 is included in the resin package 4. As shown in FIG. 3, each of the lead electrodes 45 is mechanically affixed to a connection pad or the like on the circuit substrate 100 through solder 49 at the portion of the lead electrode protruding on the lower surface 48 of the resin package 4.

Figure 6:
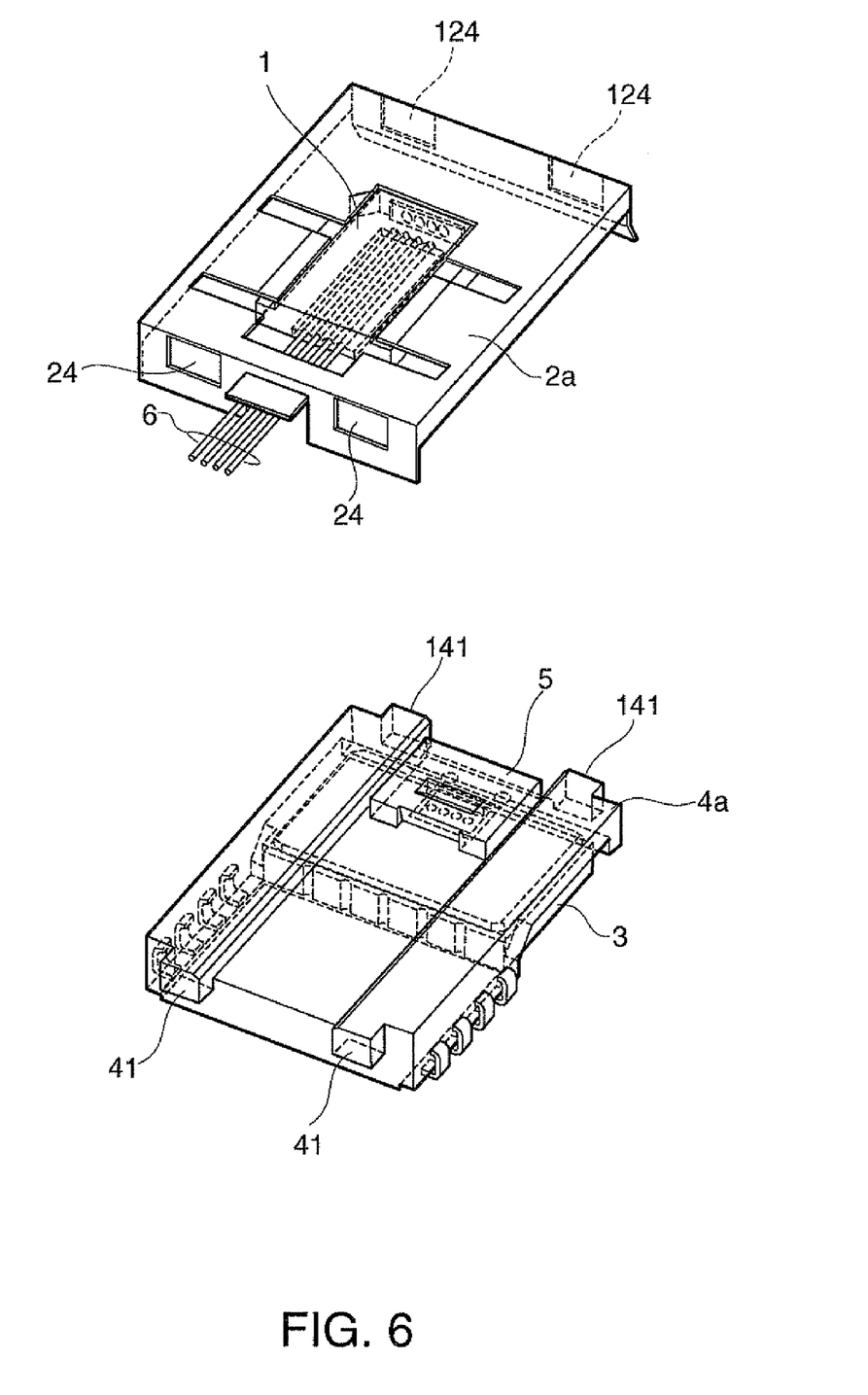
FIG. 6 is a perspective view of a structure of an optical module in accordance with a modified example of the first embodiment of the invention.

FIG. 6 is a perspective view of a structure of an optical module in accordance with a modified example of the embodiment of the invention. The optical module shown in FIG. 6 is different from the optical module described above and shown in FIG. 1 and other figures in that more engagement pins on the resin package and engagement holes on the clamp mating with these engagement pins are further added, and J-letter shaped clamps are omitted accordingly, but they generally have a common structure except the aforementioned differences. More specifically, in the optical module shown in FIG. 1 and other figures, the engagement pins 41 are provided protruding from one end of the thick portion of the optical module (at the rear end portion of the optical module). However, in a resin package 4a of the optical module shown in FIG. 6, two engagement pins 141 protruding from one end of the thin portion of the optical module (at the front tip portion of the optical module) are further provided. Also, to mate with these engagement pins 141, a clamp 2a of the optical module shown in FIG. 6 is further provided with two additional engagement holes 124.

According to the embodiment described above, the optical plug and the optical element container can be readily combined together by using the resin package. As a result, an optical module that can be readily assembled can be obtained.

Next, an optical module in accordance with a second embodiment of the invention is described. The optical module in accordance with the second embodiment is different from the optical module of the first embodiment described above mainly in the structure of a thin portion of a resin package. The second embodiment is described below, mainly focusing at the difference between the two.

Figure 7:
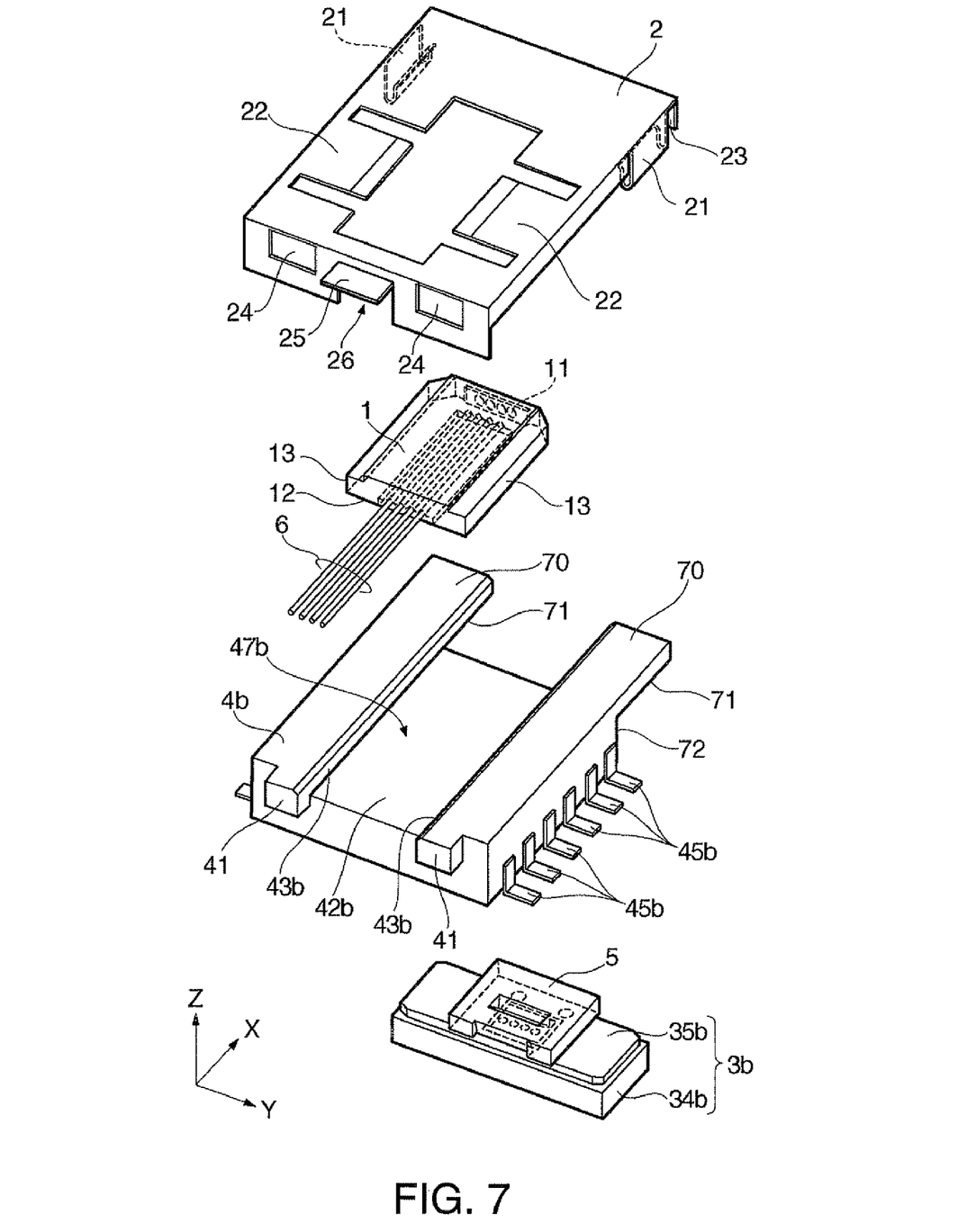
FIG. 7 is an exploded perspective view of the overall structure of an optical module in accordance with a second embodiment of the invention.
Figure 8:
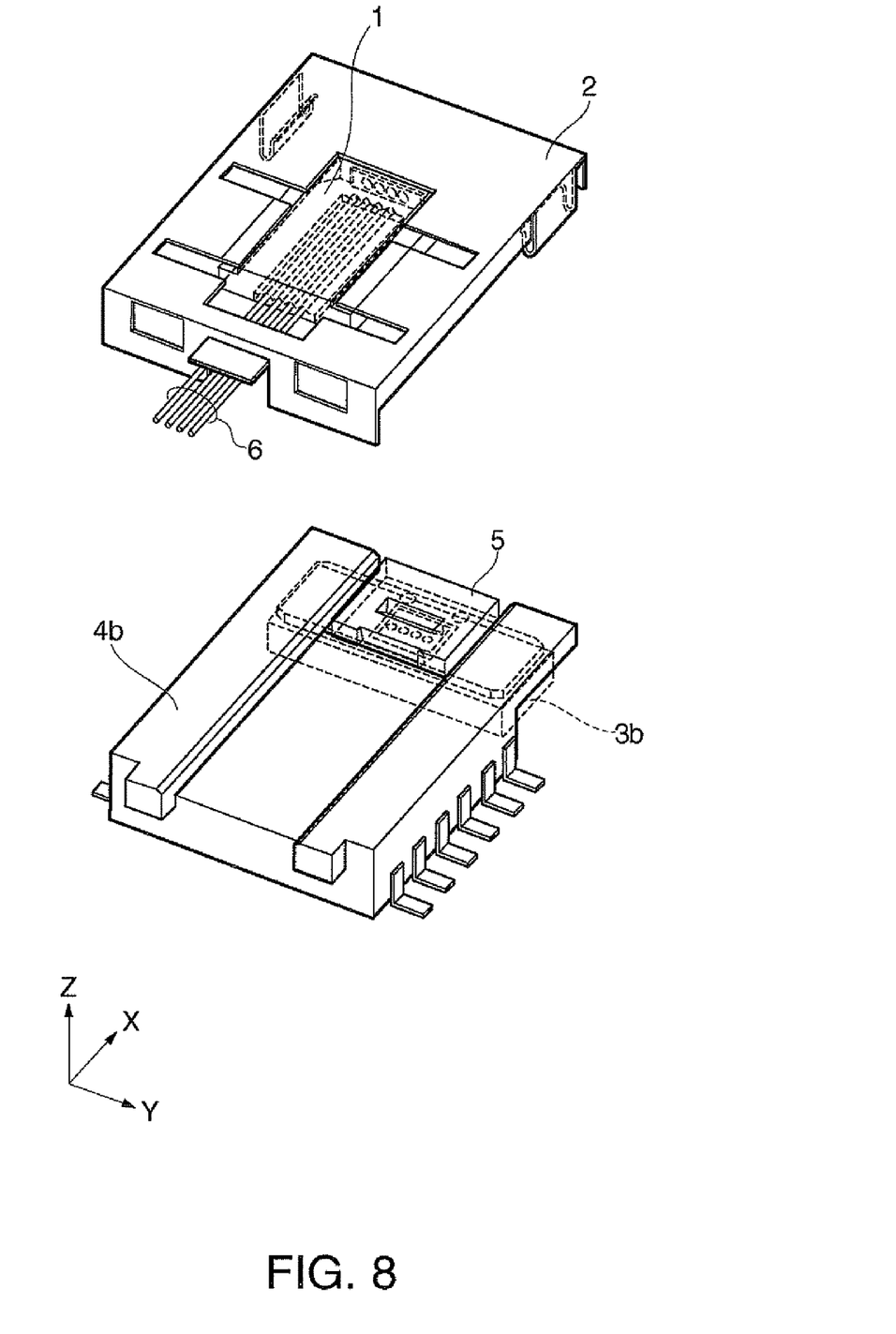
FIG. 8 is an exploded perspective view of the structure of the optical module in accordance with the second embodiment showing a plug unit and a receptacle unit separated from each other.
Figure 9:
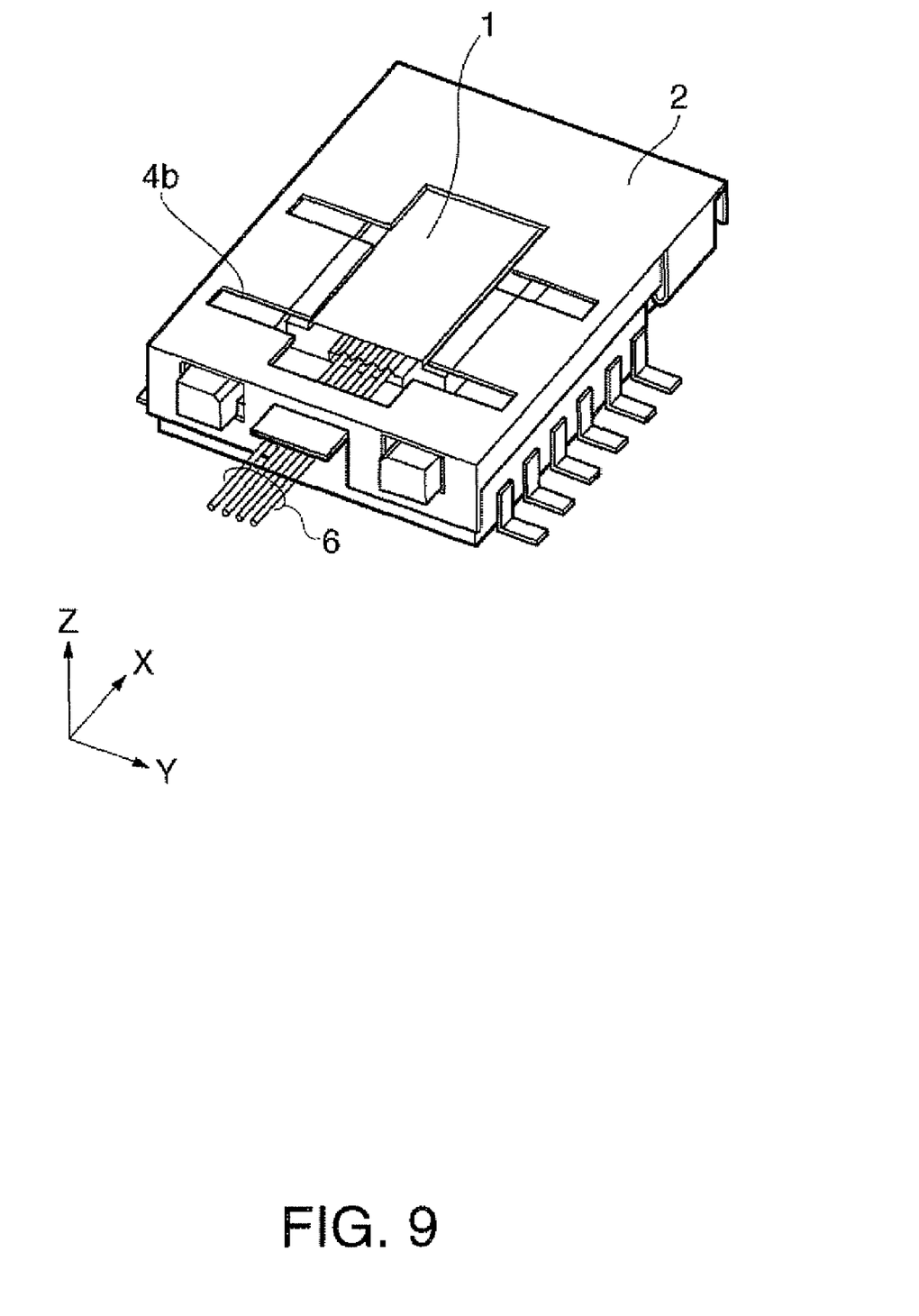
FIG. 9 is a perspective view of the optical module in accordance with the second embodiment in an assembled state.
Figure 10:
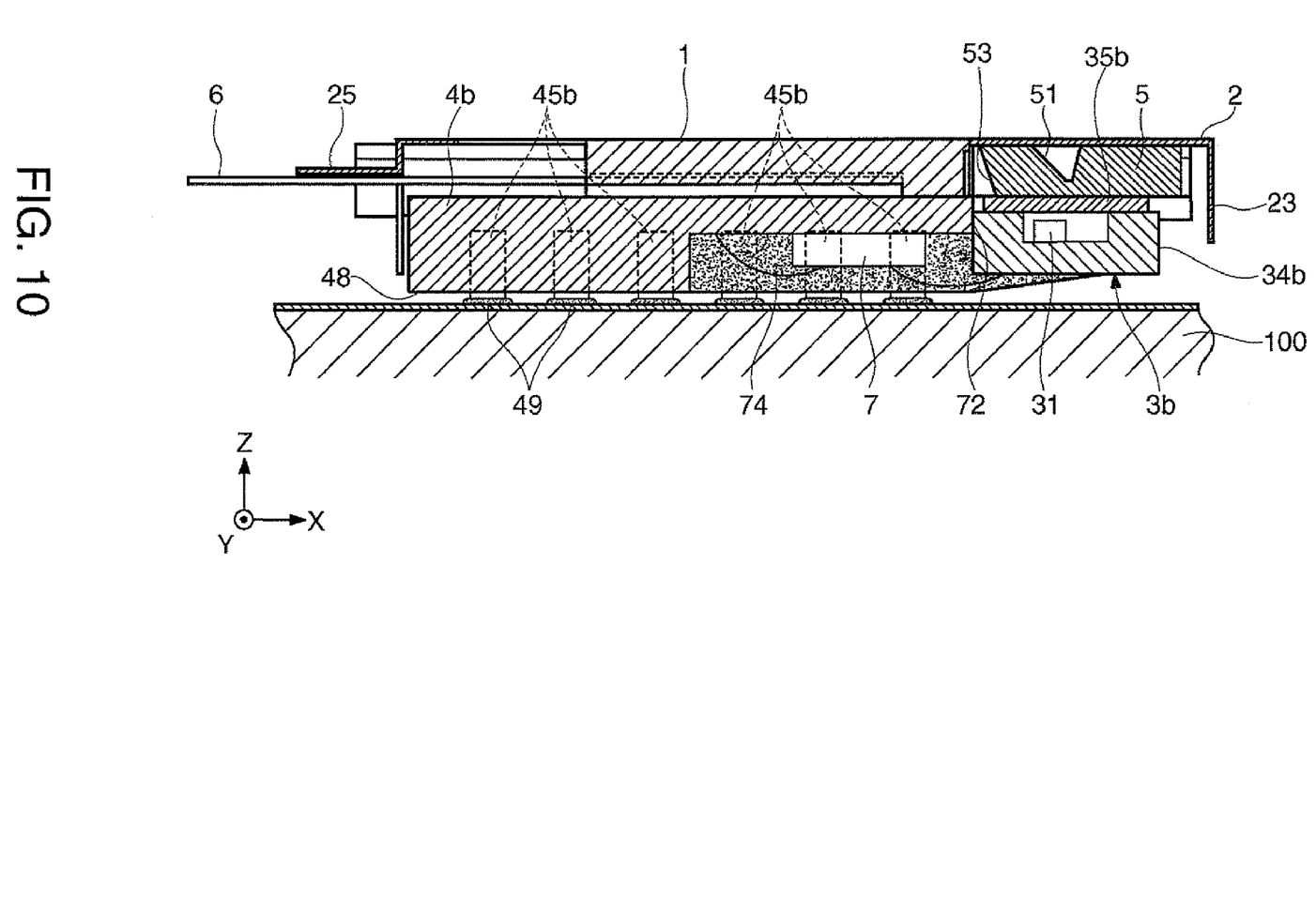
FIG. 10 is a cross-sectional view of the optical module in accordance with the second embodiment taken along a direction in which the optical fiber extends.
Figure 11:
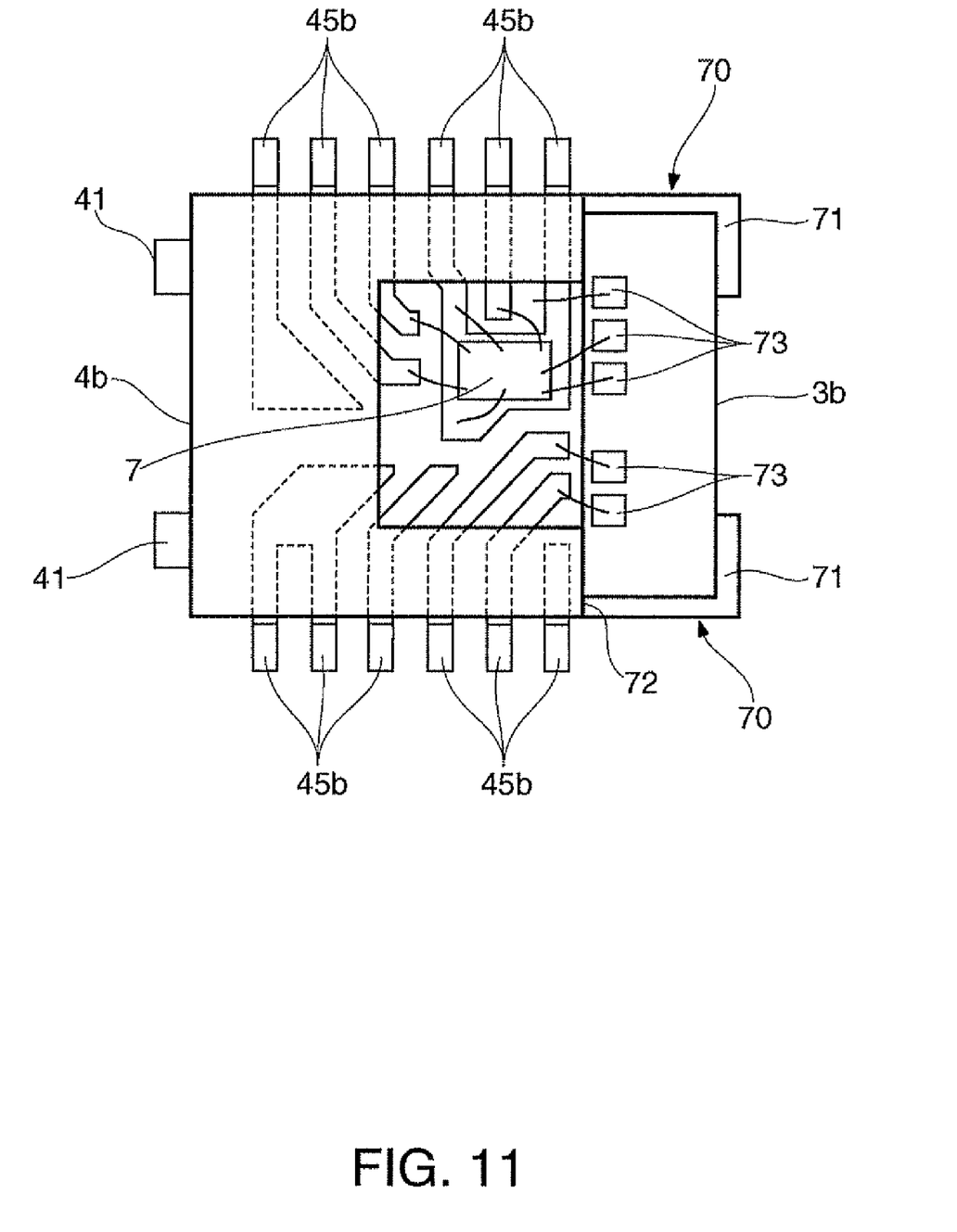
FIG. 11 is a bottom plan view of the optical module in accordance with the second embodiment.

FIG. 7 is an exploded perspective view of the overall structure of an optical module in accordance with a second embodiment of the invention. FIG. 8 is an exploded perspective view of the structure of the optical module in accordance with the second embodiment showing a plug unit and a receptacle unit separated from each other. FIG. 9 is a perspective view of the optical module in accordance with the second embodiment in an assembled state. FIG. 10 is a cross-sectional view of the optical module in accordance with the second embodiment taken along a direction in which the optical fiber extends. FIG. 11 is a bottom plan view of the optical module in accordance with the second embodiment. It is noted that, in the optical module shown in FIGS. 7-11, components that are common with those of the optical module in accordance with the first embodiment are appended with the same reference numbers. Description of these common components is omitted.

As shown in FIG. 7 and other figures, a resin package 4b in accordance with the second embodiment has a thick portion and a thin portion that is composed of two arm sections 70 protruding from one end of the thick portion and disposed interposing an optical block 5. A second guide surface 71 is formed as a surface of each of the arm sections 70 composing the thin portion. The hooks 21 described above engage with portions of the thin portion corresponding to end sections of these second guide surfaces 71, respectively. A ceramic package 3b is positioned in the Z-axis direction as its transparent surface contacts the second guide surfaces 71. Among the transparent surface of the ceramic package 3b, a region that is to be interposed between the arm sections 70 is exposed, and an optical block 5 is directly mounted on the exposed region. Also, a third guide surface 42b is formed at the thick portion.

Also, the resin package 4b has a groove section 47b formed along the extension direction of the optical fiber 6 (in the X-axis direction shown in the figure) at the thick portion described above. Among inner wall surfaces of the groove section 47b, the bottom surface is used as the third guide surface 42b described above, and the side surfaces are used as first guide surfaces 43b. The roles of the third guide surface 42b and the first guide surfaces 43b are the same as those of the third guide surface 42 and the first guide surfaces 43 in accordance with the first embodiment described above, respectively. The width of the groove section 47b (i.e., the distance between the two first guide surfaces 43b) is generally equal to the width of the optical plug 1 (i.e., the distance between the two second surfaces 13). Also, in order to smooth out an operation to fit the optical plug 1 in the groove section 47b, sloped surfaces are provided on the side walls of the groove section 47b at its upper side.

As shown in FIG. 10 and FIG. 11, the ceramic package 3b is in contact with the second guide surfaces 71 defined by the one surfaces of the arm sections 70, and also in contact with a third guide surface 72 that is formed adjacent a border between the thin portion and the thick portion of the resin package 4b and disposed generally orthogonal to the second guide surfaces 71. By this, the ceramic package 3b is positioned in two directions.

A plurality of electrode pads 73 are formed on a surface of the ceramic package 3b. The electrode pads 73 are electrically connected to the optical element 31 contained in the ceramic package 3b through internal wirings. In the present embodiment, a circuit chip such as a driver for driving the optical element 31 or the like may not be contained in the ceramic package 3b. As illustrated, a circuit chip 7 is disposed in a recessed section of the resin package 3b on its back side (on the opposite side of the surface on which the optical plug 1 is mounted), and sealed with a sealing member 74. The electrode pads 73 described above are electrically connected to the circuit chip 7 through bonding wires or to lead frames 45b.

Characteristics of the lead frames 45b are further described. As shown in FIG. 7, the lead frames 45 in accordance with the present embodiment each have a portion exposed on the outside of the resin package 4b which is in a generally L-letter shape, and extends in a direction away from the resin package 4a. Also, the lead frames 45 have portions that are also exposed in the recessed section of the resin package 4b, and are electrically connected at the exposed portions to the electrode pads 73 of the ceramic package 3b through bonding wires. Also, as shown in a plan view of FIG. 11, the lead frames 45b are structured in a manner that those of the lead frames 45b closer to the ceramic package 3b are successively connected to the electrode pads 73. Also, among the lead frames 45b, portions included in the resin package 4b closer to the rear end side (on the left side in the figure) of the resin package 4b are formed to be wider. By this, influence by the bending stress of the optical fiber 6 can be alleviated.

It is noted that, when the ceramic package 3b contains optical elements 31 for both transmission and reception, the lead frames 45b may preferably be divided for different usages, for example, into one group arranged on one side of the resin package 4b (for example, those arranged on the upper side in the figure) for reception, and the other group on the other side for transmission.

Also according to the second embodiment, the optical plug and the optical element container can be readily combined by using the resin package. Accordingly, an optical module that can be readily assembled can be obtained.

It is noted that the invention is not limited to the details of each of the embodiments described above, and many modifications can be made and implemented within the scope of the subject matter of the invention.

What is claimed is:

1. An optical module comprising:
an optical plug that supports one end of an optical fiber and has a first surface that is generally in parallel with an extension direction of the optical fiber at one end side thereof and two second surfaces traversing the first surface;
an optical element container that has an optical element and a transparent surface traversing an optical axis of the optical element, and is disposed such that the optical axis of the optical element and an optical axis of the optical fiber cross one another;
an optical block having an optical reflection surface disposed at an intersection of the optical axis of the optical element and the optical axis of the optical fiber; and a resin member that includes a first guide surface in contact with one of the two second surfaces of the optical plug and a second guide surface in contact with the transparent surface of the optical container on which the optical plug is mounted,
wherein the resin member includes a thin portion having a first thickness relatively small in a first direction orthogonal to the optical axis of the optical fiber and a thick portion having a second thickness greater than the first thickness of the thin portion, wherein the second guide surface is formed as one surface of the thin portion.

2. An optical module according to claim 1, wherein the optical plug is disposed in contact with the optical block.

3. An optical module according to claim 1, wherein the resin member further includes a third guide surface in contact with the first surface of the optical plug, the third guide surface is formed extending over the thin portion and the thick portion, and the optical block is disposed on the third guide surface.

4. An optical module according to claim 1, wherein the thin portion includes two arm sections protruding from one end of the thick portion and disposed interposing the optical block, and the second guide surface is formed as a surface of each of the arm sections.

5. An optical module according to claim 4, wherein the optical block is disposed on the transparent surface of the optical element container.

6. An optical module according to claim 1, wherein the sum of the thickness of the thin portion and the thickness of the optical element container in the first direction is generally equal to the thickness of the thick portion in the first direction.

7. An optical module according to claim 1, wherein the resin member further includes a third guide surface in contact with the first surface of the optical plug, and further comprising a holder having a leaf spring section that is in contact with the optical plug and forces the optical plug to the third guide surface and a hook that engages with the thin portion of the resin member wherein the holder covers the resin member and the optical plug.

8. An optical module according to claim 7, wherein the resin member further includes protruded sections protruding from one end of at least one of the thin portion and the thick portion along an optical axis direction of the optical fiber, and the holder further includes opening sections that mate with the protruded sections of the resin member.

* * * * *

UNITED STATES PATENT AND TRADEMARK OFFICE
CERTIFICATE OF CORRECTION

PATENT NO. : 7,419,312 B2  
APPLICATION NO. : 11/626421  
DATED : September 2, 2008  
INVENTOR(S) : Kimio Nagasaka Page 1 of 1

It is certified that error appears in the above-identified patent and that said Letters Patent is hereby corrected as shown below:

On the title page, insert item:

--(30) Foreign Application Priority Data  
February 8, 2006 (JP) 2006-030598--

Signed and Sealed this

Fifteenth Day of September, 2009

David J. Kappos  
*Director of the United States Patent and Trademark Office*